US012382223B1

(12) United States Patent
Mai

(10) Patent No.: US 12,382,223 B1
(45) Date of Patent: Aug. 5, 2025

(54) USB GAMING HEADPHONE WITH DUAL-SOUND-CARD OUTPUT

(71) Applicant: Zhaoqing Hejia Electronics Co., LTD, Zhaoqing (CN)

(72) Inventor: Qibin Mai, Gaoyao (CN)

(73) Assignee: Zhaoqing Hejia Electronics Co., LTD, Zhaoqing (CN)

( * ) Notice: Subject to any disclaimer, the term of this patent is extended or adjusted under 35 U.S.C. 154(b) by 0 days.

(21) Appl. No.: 18/911,860

(22) Filed: Oct. 10, 2024

(51) Int. Cl.
*H04R 5/04* (2006.01)
*H04R 1/08* (2006.01)
*H04R 5/033* (2006.01)

(52) U.S. Cl.
CPC ............... *H04R 5/04* (2013.01); *H04R 1/083* (2013.01); *H04R 5/0335* (2013.01); *H04R 2420/09* (2013.01); *H04R 2430/01* (2013.01)

(58) Field of Classification Search
None
See application file for complete search history.

(56) References Cited

U.S. PATENT DOCUMENTS 8,577,052 B2 * 11/2013 Silber ...................... H04R 5/04 381/74
9,100,744 B2 * 8/2015 Sim ...................... H04R 1/1041
9,716,947 B1 * 7/2017 Reynolds, Jr. ....... H04R 1/1041
9,936,297 B2 * 4/2018 Dennis ..................... H04R 5/04
10,468,160 B2 * 11/2019 Yin ......................... F21V 19/02
11,985,472 B2 * 5/2024 Honeycutt ........... H04R 1/1033
2010/0040240 A1 * 2/2010 Bonanno ................ H04R 5/033 381/74
2015/0334485 A1 * 11/2015 Tyagi ................. G02B 6/02395 381/74
2024/0007780 A1 * 1/2024 Bonanno ................. G10L 15/22
2024/0171925 A1 * 5/2024 Robertson ................. H04S 3/02
2024/0342591 A1 * 10/2024 Kuruba Buchannagari ................ A63F 13/54

FOREIGN PATENT DOCUMENTS

CN 110430495 A 11/2019
CN 210351552 U 4/2020
CN 214901255 U 11/2021

* cited by examiner

*Primary Examiner* — Paul W Huber
(74) *Attorney, Agent, or Firm* — Nitin Kaushik

(57) ABSTRACT

The present invention provides a USB gaming headphone with dual-sound-card output, which includes a main chip, an headphone amplifier chip circuit, a microphone, and a total volume potentiometer, where the main chip is at least provided with 2 sound cards, and the main chip is also electrically connected to a mixing potentiometer and the microphone, and the mixing potentiometer adjusts the output of the sound cards proportionally, amplifies signals from left and right channels through the headphone amplifier chip circuit, and then performs electrical-sound conversion through a speaker. The present invention is provided with 2 output sound card devices in the main chip. By adjusting the proportion of two output channels through the mixing potentiometer.

8 Claims, 9 Drawing Sheets

USB GAMING HEADPHONE WITH DUAL-SOUND-CARD OUTPUT

TECHNICAL FIELD

The present invention relates to the technical field of headphones, and in particular, to a USB gaming headphone with dual-sound-card output.

BACKGROUND

With continuous progress of society, people's demands are constantly increasing, and especially gamers have higher requirements for game equipment, and also need more customization and personalized requirements for product functionality. At present, gaming headphones on the market usually have: microphone volume adjustment, headphone volume adjustment, EQ mode, and light effects. There is only one speaker output device and only one sound recording input device mapped on a computer. When such headphones are actually used by the gamers, there is a problem that when playing online games, users need to listen to both their game background sound and the sound of networking teammates. Due to the fact that there is only one output mapping device on the computer, it is not possible to separately allocate the sound volume for networking teammates' voice and game background sound. This also results in the inability to individually adjust volume of the game background sound and the teammates' voice. The sound ratio of the background sound to teammates' voice cannot be adjusted, resulting in a loud volume when adjusting headphones. Both the voice and the background sound are too loud, making it difficult to quickly and freely control the ratio, which does not meet the functional requirements of the gamers. Thus, the gaming headphone with dual-sound-card output devices is proposed to solve the above problems.

SUMMARY

In view of this, the present invention provides a USB gaming headphone with dual-sound-card output, which solves the problems in the background art that existing gaming headphone on the market do not have the function of dual-sound-card output, cannot select output devices separately, and cannot adjust the ratio of teammates' voice to the volume of the game background sound.

The present invention provides a USB gaming headphone with dual-sound-card output, which specifically includes a main chip, an headphone amplifier chip circuit, a microphone, and a total volume potentiometer, where the main chip is at least provided with 2 sound cards, and the main chip is also electrically connected to a mixing potentiometer and the microphone, the mixing potentiometer adjusts the output of the sound cards proportionally, amplifies signals from left and right channels through the headphone amplifier chip circuit, and then performs electrical-sound conversion through a speaker. The technical solution can independently change the volume of the background sound and teammates' voice during the game.

Further, the microphone is sequentially connected to a microphone input circuit, a microphone amplification circuit, a microphone potentiometer, and the main chip.

Preferably, the main chip is also electrically connected to a microphone mute switching switch and a microphone noise reduction switch, the microphone mute switching switch is used to control mute switching of a microphone, and the microphone noise reduction switch is used to switch noise reduction of the microphone.

More preferably, the main chip is connected to an external device through a USB connector.

Optionally, the main chip is also electrically connected to a light control chip and a light effect switching switch, and the light control chip is electrically connected to light beads on a headphone.

In further description of the aforementioned scheme, the main chip, the headphone amplifier chip circuit, the microphone mute switching switch, the microphone noise reduction switch, and the mixing potentiometer are all mounted in a control box, the control box is also provided with an EQ switching switch, the light effect switching switch, the total volume potentiometer, and a microphone potentiometer, the EQ switching switch is used to switch sound output modes, including a movie mode, a music mode and a game mode, the light effect switching switch is used to switch light effects, the total volume potentiometer is used to adjust a total volume output, and the microphone potentiometer is used to adjust a microphone input.

Optionally, the main chip is connected to a wireless communication module and a rechargeable battery.

The gaming headphone includes left and right ear shells connected by a headband, and a data line, the control box is mounted on the data line, and the light control chip and the light beads are mounted in the ear shells, a back of the control box is also provided with a back clip, and the main chip is electrically connected to an indicator light.

Compared with the prior art, the present invention is provided with 2 output sound card devices in the main chip, and the 2 sound card devices are connected to the mixing potentiometer. By adjusting the proportion of two output channels through the mixing potentiometer, the proportion of the sound size ratio of different sound-card outputs can be adjusted; the present invention allows for individual selection of the output devices, enabling direct adjustment of the proportion of the game background sound and chat voice during gaming and chatting, and effectively preventing interference from other sounds; the main chip has multiple built-in modes that can support voice changing effects (such as a male-to-female voice changing effect, robot voice, doll voice, and a female-to-male voice changing effect) of sound, and also has multiple modes of ambient light effects to meet the personalized needs of current gamers; and the main chip also has a USB-HID communication protocol, which can communicate with computers or mobile devices through an HID communication protocol of a USB for SDK communication (i.e. upper computer APP control and interaction), enabling more personalized functions (such as personalized customization of RGB ambient lights, multi-stage setting customization of the EQ mode, microphone reverberation, microphone volume, microphone dynamic limit, and more voice change customization).

BRIEF DESCRIPTION OF THE DRAWINGS

To describe the technical solutions in embodiments of the present invention more clearly, the following briefly introduces the accompanying drawings for describing the embodiments. Apparently, the accompanying drawings in the following description show merely some embodiments of the present invention, and those skilled in the art may still derive other accompanying drawings from these accompanying drawings without making creative efforts.

Figure 1:
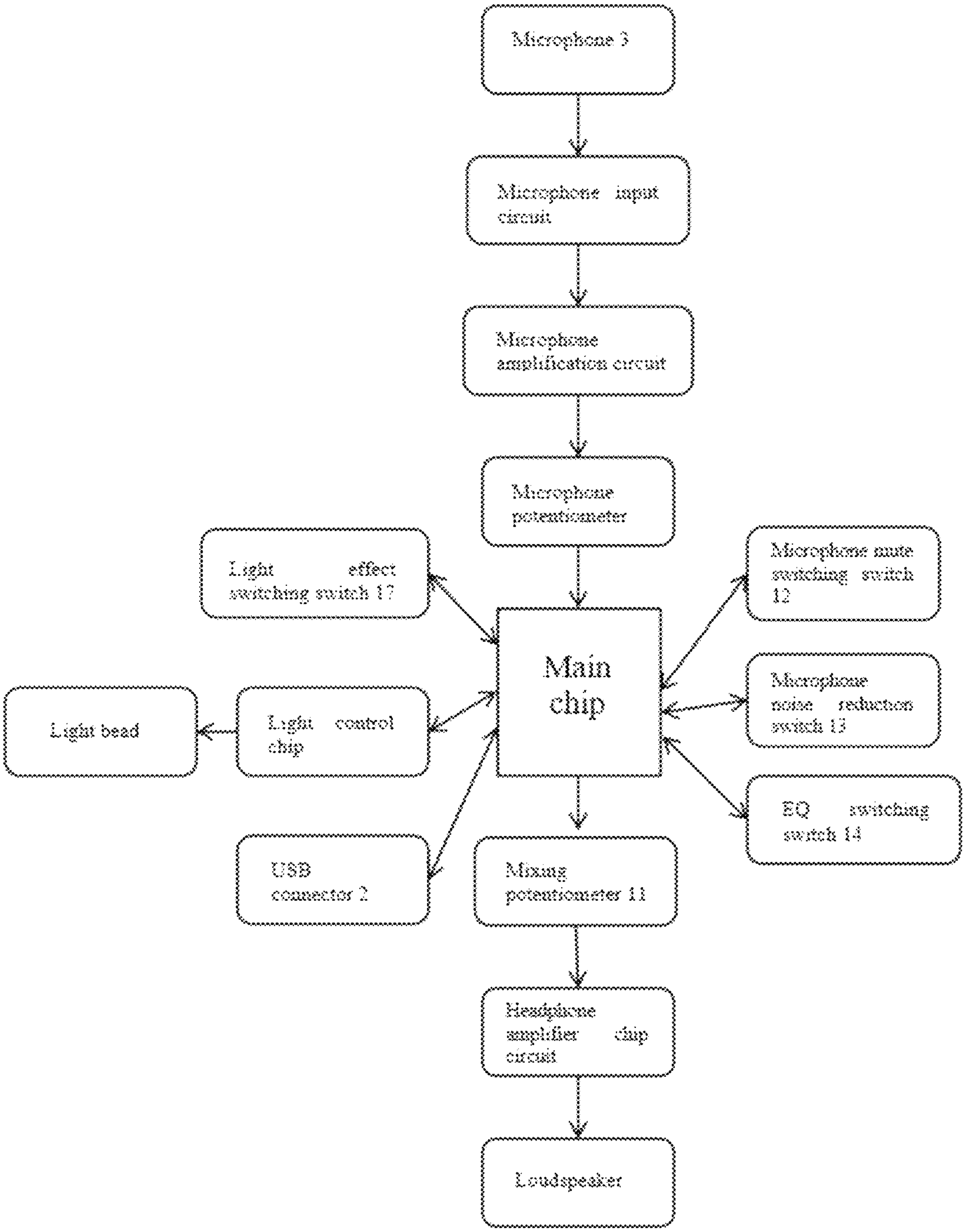
FIG. 1 is a schematic diagram of a principle provided by embodiments of the present invention.

Herein, reference numerals in the drawings:

1, control box; 11, mixing potentiometer; 12, microphone mute switching switch; 13, microphone noise reduction switch; 14, EQ switching switch; 15, total volume potentiometer; 16, back clip; 17, light effect switching switch; 2, USB connector; 3, microphone; 4, ear shell; 5, headband.

Through the above drawings, clear embodiments of the present invention have been shown, which will be described in more detail in the following text. These drawings and textual descriptions are not intended to limit the scope of the inventive concept in any way, but rather to illustrate the concept of the present invention for those skilled in the art by referring to specific embodiments.

DETAILED DESCRIPTION OF THE EMBODIMENTS

The technical solutions in embodiments of the present invention will be described clearly and completely hereinafter with reference to the accompanying drawings in the embodiments of the present invention. It is obvious that the described embodiments are a part of the embodiments of the present invention, but not all the embodiments. Based on the embodiments in the present invention, all other embodiments obtained by those of ordinary skill in the art without making creative labor fall within the scope of protection of the present invention.

It should be noted that, when an element is described to be “fixed to” another element, it may be directly positioned on another element or there may be a centered element. When an element is described to be “connected to” another element, it may be directly connected to another element or there may additionally be a centered element. On the contrary, when an element is referred to as “being directly on” another element, there is no intermediate element. The terms “vertical”, “horizontal”, “left”, “right” and similar expressions are used for illustrative purposes only and not intended to be expressed as the only embodiment. The terms “upper end”, “lower end”, “left side”, “right side”, “front end”, “back end” and similar expressions used herein are based on the positional relationship of the reference drawings.

To make the technical solutions and advantages of the present invention clearer, the following further describes the embodiments of the present invention in detail with reference to the accompanying drawings.

Please refer to FIGS. 1-9, the present invention provides a USB gaming headphone with dual-sound-card output, which specifically includes a main chip, an headphone amplifier chip circuit, a microphone 3, and a total volume potentiometer 15, where the main chip is at least provided with 2 sound cards, and the main chip is also electrically connected to a mixing potentiometer 11 and the microphone 3, the mixing potentiometer 11 adjusts the output of the sound cards proportionally, amplifies signals from left and right channels through the headphone amplifier chip circuit, and then performs electrical-sound conversion through a speaker. The technical solution can independently change the volume of the background sound and teammates’ voice during the game. The microphone 3 is sequentially connected to a microphone input circuit, a microphone amplification circuit, a microphone potentiometer, and the main chip. In the embodiment, the main chip is also electrically connected to a microphone mute switching switch 12 and a microphone noise reduction switch 13, the microphone mute switching switch 12 is used to control mute switching of the microphone, and the microphone noise reduction switch 13 is used to switch noise reduction of the microphone. The main chip is connected to an external device through a USB connector 2. The main chip is also electrically connected to a light control chip and a light effect switching switch 17, and the light control chip is electrically connected to light beads on a headphone.

Figure 2:
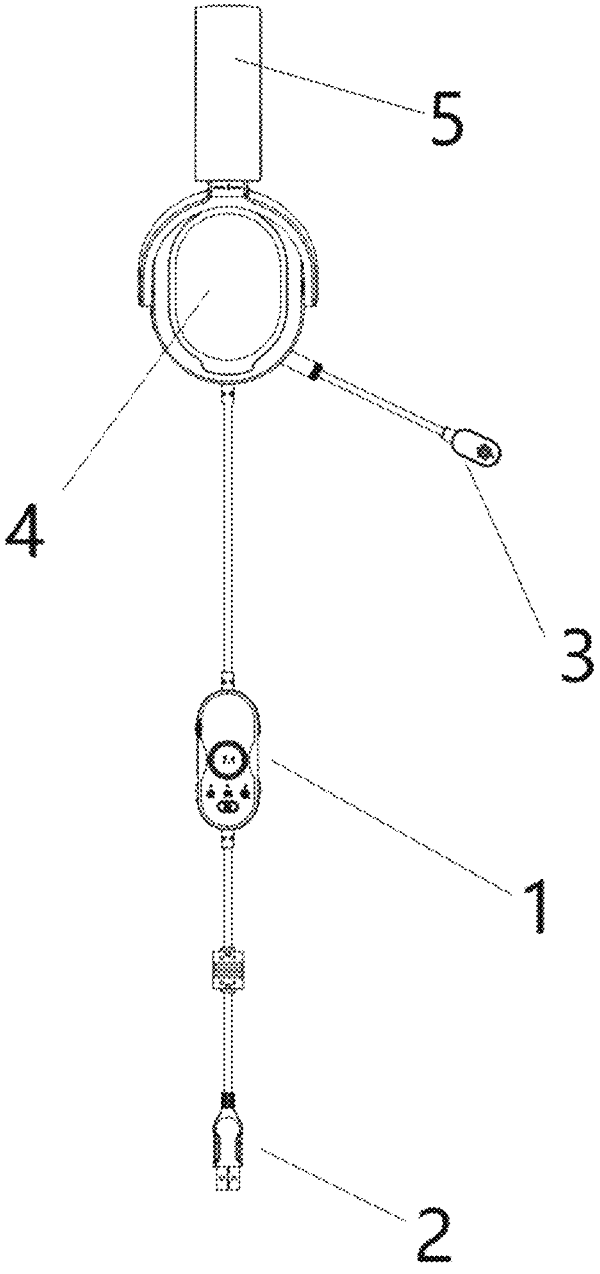
FIG. 2 is an overall schematic diagram provided by embodiments of the present invention.
Figure 3:
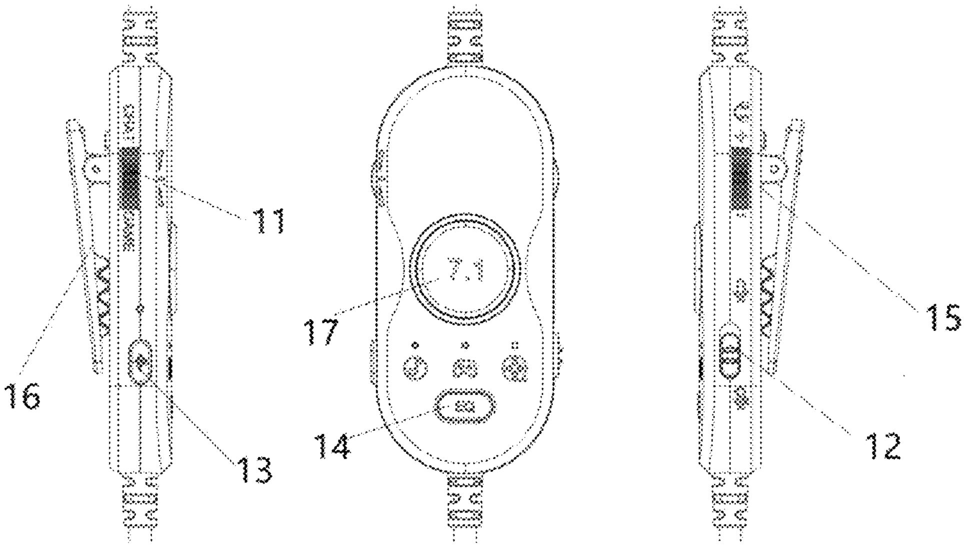
FIG. 3 is a schematic diagram of a control box provided in embodiments of the present invention.
Figure 4:
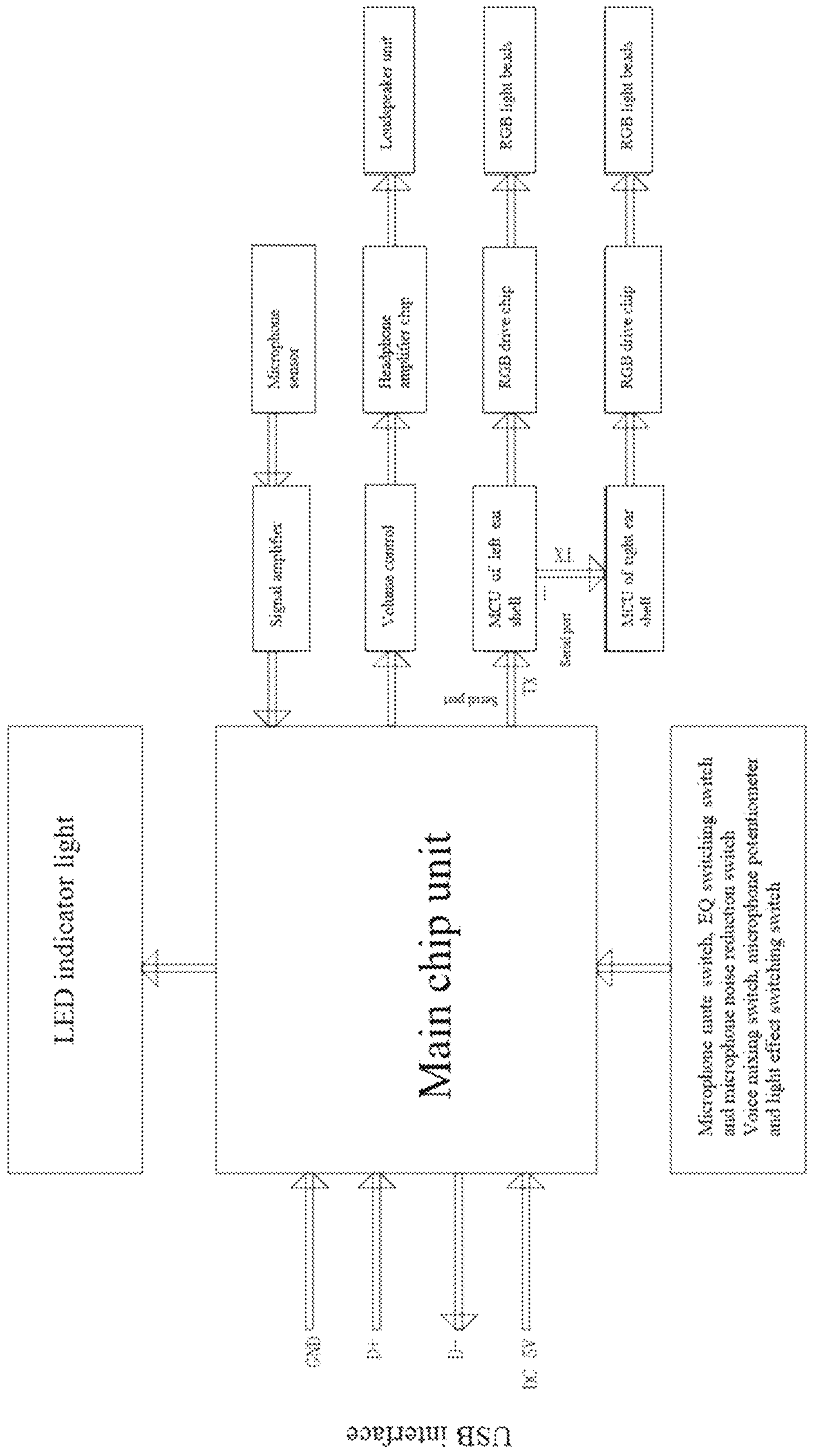
FIG. 4 is a schematic diagram of a principle provided by embodiments of the present invention.

As shown in FIGS. 1 and 2, the main chip, the headphone amplifier chip circuit, the microphone mute switching switch 12, the microphone noise reduction switch 13, and the mixing potentiometer 11 are all mounted in a control box 1, the control box 1 is also provided with an EQ switching switch 14, the light effect switching switch 17, the total volume potentiometer 15, and a microphone potentiometer, the EQ switching switch 14 is used to switch sound output modes, including a movie mode, a music mode, and a game mode, the light effect switching switch 17 is used to switch light effects, the total volume potentiometer 15 is used to adjust a total volume output, and the microphone potentiometer is used to adjust a microphone input. The gaming headphone includes left and right ear shells 4 connected by a headband 5, and a data line, the control box 1 is mounted on the data line, and the light control chip and the light beads are mounted in the ear shells 4, a back of the control box 1 is also provided with a back clip 16, and the main chip is electrically connected to an indicator light.

In other embodiments, the main chip is connected to a wireless communication module and a rechargeable battery. The wireless communication module is used to be wirelessly connected to smart devices such as computers and mobile phones.

Figure 5:
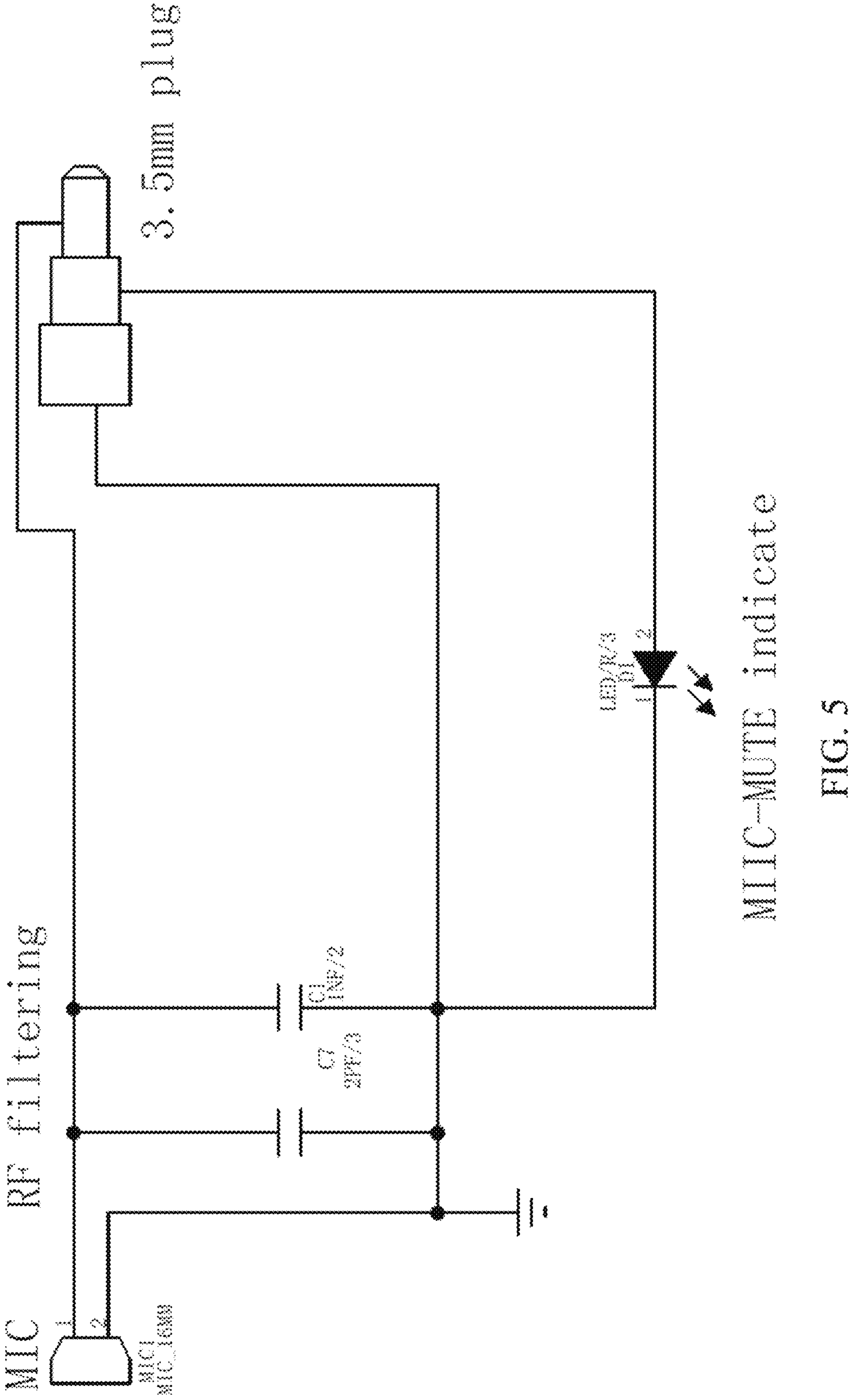
FIG. 5 is a microphone circuit diagram provided by embodiments of the present invention.

As shown in FIG. 5, an acoustic electric sensor inside the microphone converts sound into electrical signals. The electrical signals are subjected to RF filtering through C7 and C1 to prevent high-frequency signal interference such as mobile phone signal interference, wireless mouse signal interference, and wireless keyboard signal interference. The signals are transmitted directly to the end of a 3.5 mm plug, and then the 3.5 mm plug of a microphone rod is inserted into a microphone jack in the left ear shell 4. Through a PCBA board in a left ear board, the signals are connected to the control box 1 by means of a wire control. After passing through the power supply circuit and through internal amplification of the chip, microphone monitoring and a USB upstream recording path are realized. A mute indicator light of the microphone is also arranged in the microphone rod, which is convenient for indicating the recording state or the muting state of the microphone.

Figure 6:
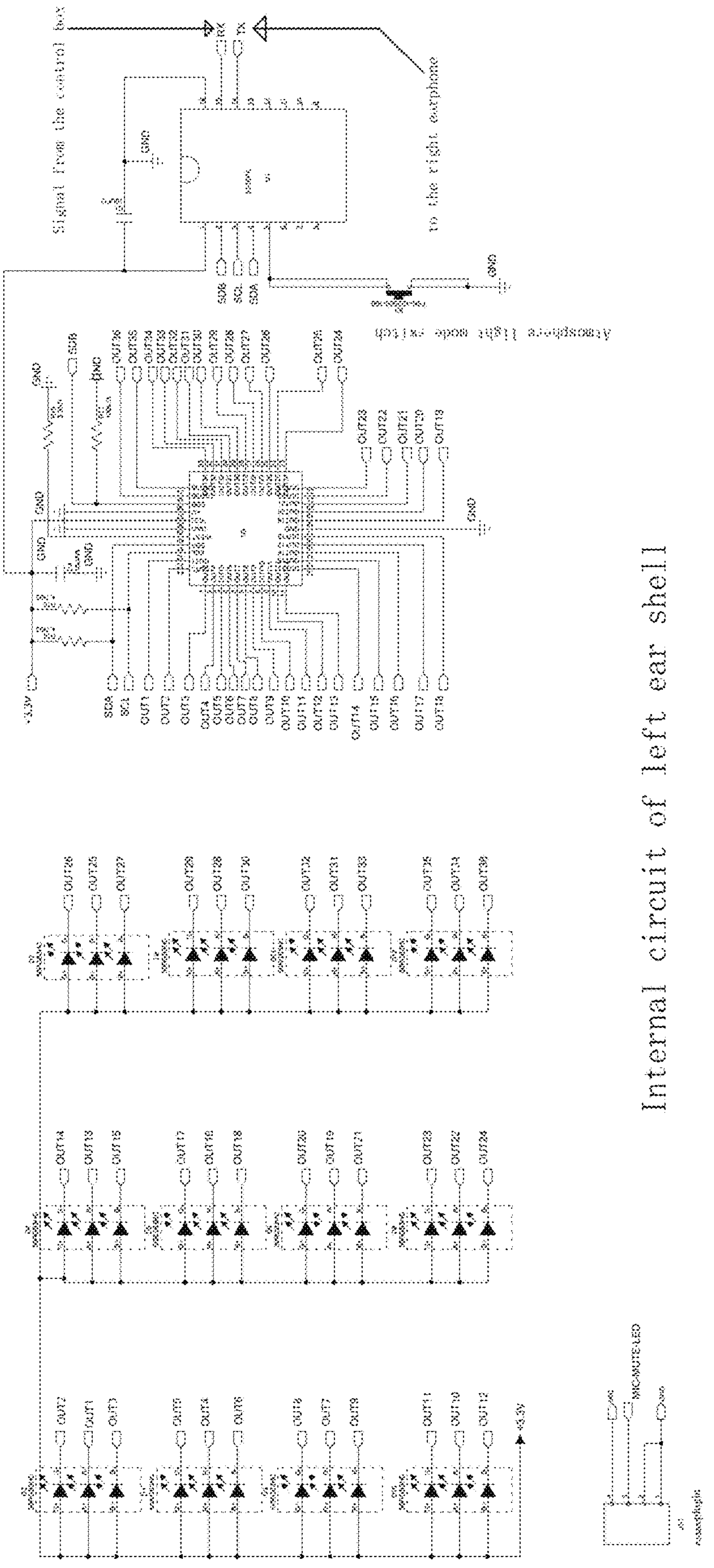
FIG. 6 is a schematic diagram of a PCBA circuit inside a left ear shell provided by embodiments of the present invention.
Figure 7:
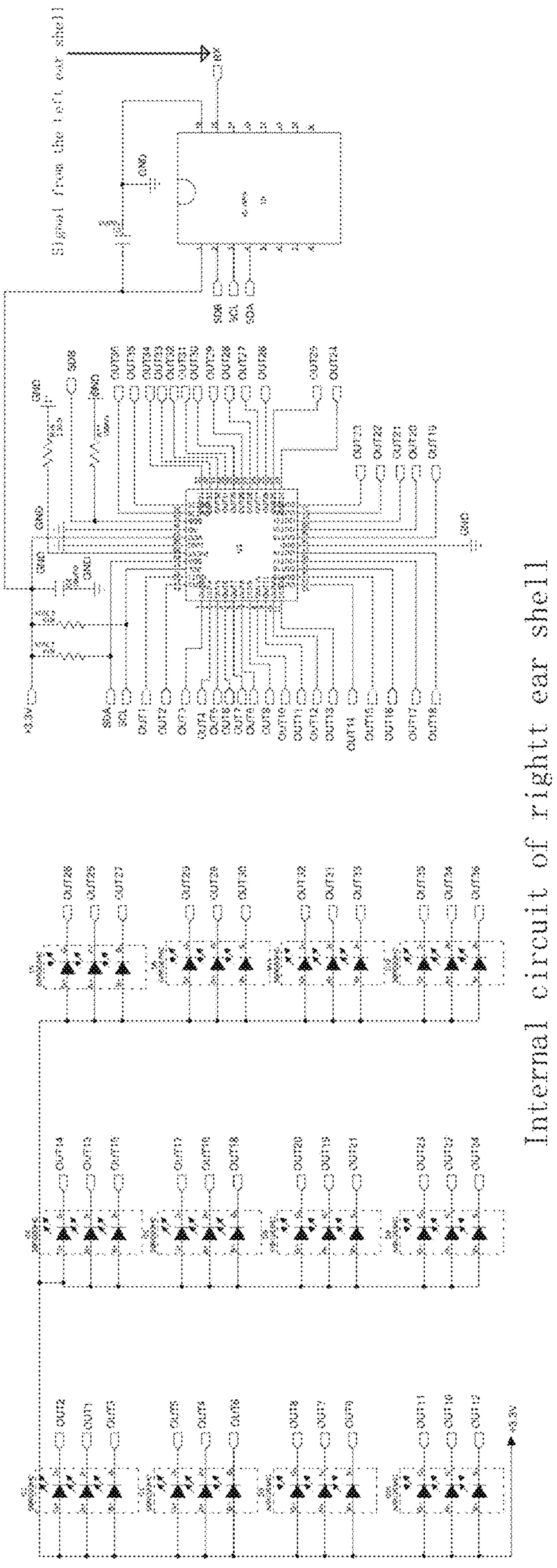
FIG. 7 is a schematic diagram of a PCBA circuit inside a right ear shell provided by embodiments of the present invention.

As shown in FIGS. 6 and 7, U1 in the FIGS. is the light control chip, which mainly controls the data of the ambient light chip. By outputting SDB, SCL, SDC data to the RGB light drive chip of the U3 chip, U3 controls DI-D12 to control output of colors of RGB lights. At the same time, the light control chip receives a TX signal from serial communication of the control box 1, which facilitates APP control on a PC, i.e., the ambient light is controlled by an upper computer. U1 sends the light effect mode data to the light control chip of the right ear shell 4 through a serial port TX to control the ambient light at the right end, and can also synchronize the light effect data to avoid the problem of inconsistent light effects on two sides due to clock errors inside the chip. At the same time, U1 is externally connected to the light effect switching switch 17, which can quickly switch the light effect modes.

Figure 8:
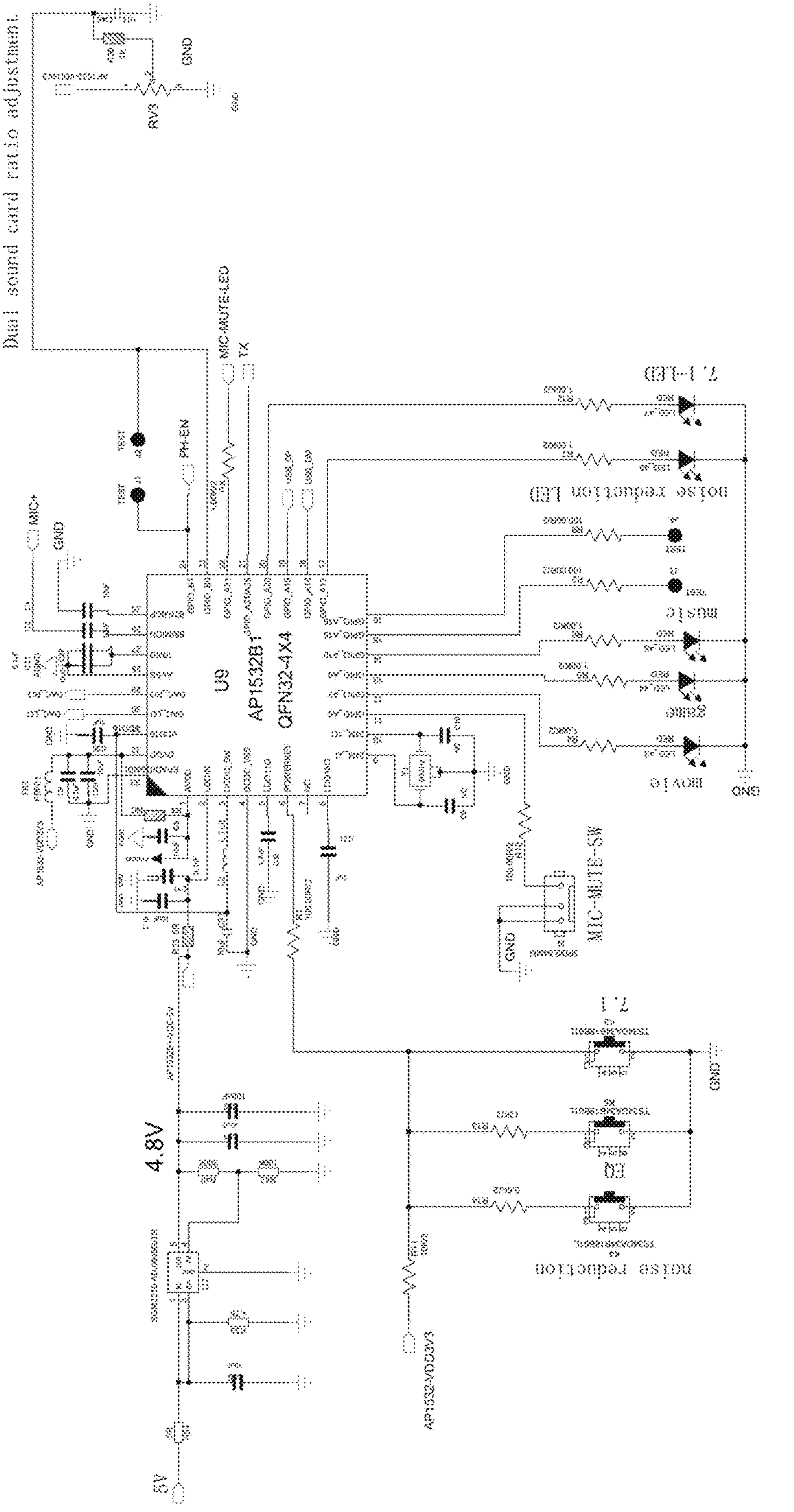
FIG. 8 is a circuit diagram of a main chip of a control box provided by embodiments of the present invention.

As shown in FIG. 8, U9 is the main chip, mainly responsible for connecting the D+, D−, VCC and GND of USB, processing signal uplink communication, microphone uplink communication, music downlink communication, and besides, software communication that performs SDK interaction with PC. The U9 main chip can be mapped to two output speaker devices and one recording device on a computer. The EQ switching switch 14 is connected to the main chip, and the EQ modes include a movie mode, a music mode, and a game mode. The main chip U9 is also connected to the microphone noise reduction switch 13. By pressing the microphone noise reduction switch 13, a microphone noise reduction function will be enabled or disabled.

The main chip U9 is connected to the microphone mute switching switch 12. When the switch is turned on, a microphone channel enters a mute state. A high level outputted by a pin 22 of the main chip is connected to the microphone mute light through R8 output, and the LED light at the microphone position of the microphone rod is red. When the microphone mute switch J9 is turned off, the microphone enters a recording enabled state, that is, a non-mute state, and the LED light at the microphone position on the microphone rod is off.

The main chip U9 is connected to the mixing potentiometer 11 of the dual-sound-card device. A pin 1 of the mixing potentiometer 11 is connected to a 3.3V stabilized output pin of the main chip, a pin 3 is connected to a ground wire, and a pin 2 is a center tap. By sliding the potentiometer RV3 to different positions, different voltages are obtained, and then the voltages are outputted through the pin 2. Through R30 and C46, an RC filtering network is formed, such that interference noise and AC ripples are filtered out. Then, the processed voltages enter the pin 23 of the main chip U9 and enter an internal ADC for detection. The magnitude or size of the voltages is detected, and an internal program of the main chip U9 distributes a sound output size ratio of a mapped sound card 1 and a mapped sound card 2 on the computer. After the adjusted sound ratio size is internally amplified and filtered, stereo sound signals of the left and right channels are outputted from pins 29 and 30 of the main chip, and then connected to the headphone amplifier circuit unit. A USB line is connected to a power supply for supplying electricity. After being stabilized and filtered by a voltage regulator chip U7, the supplied electricity is then supplied to the main chip U9, ensuring that the main chip operates in a stable state.

Figure 9:
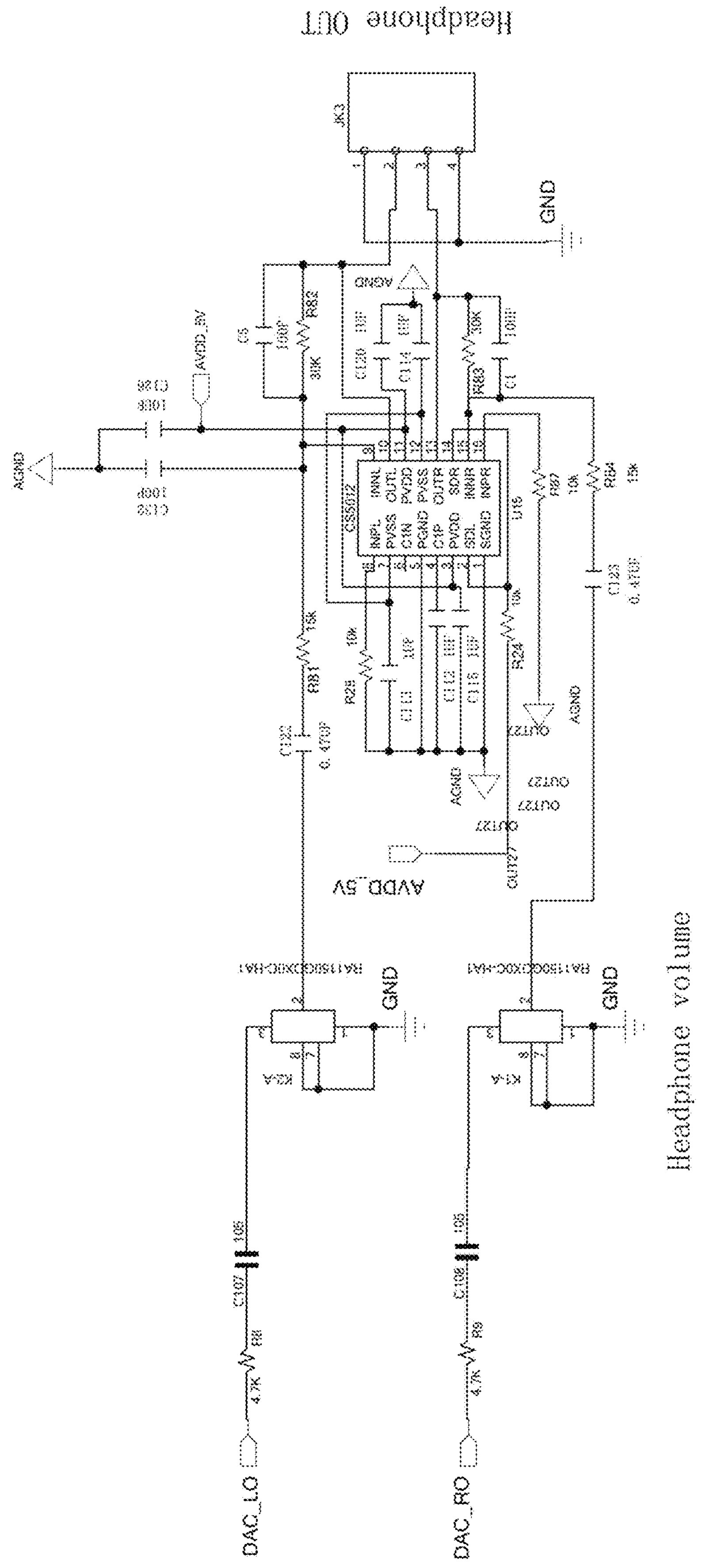
FIG. 9 is a circuit diagram of an headphone amplifier provided by embodiments of the present invention.

After the main chip U9 performs internal DAC, an audio signal outputs stereo sound from the pins 29 and 30 of the main chip U9. The sound volume of the stereo sound that is outputted by the headphone is adjusted by K1-A and K2-A potentiometers in FIG. 9. After being coupled by C122 and C123, the stereo sound enters pins 9 and 15 of the headphone amplifier chip U15 through R81 and R84 resistors. After amplification and inversion by an amplifier, the stereo sound is outputted from pins 10 and 13 of the headphone amplifier chip U15. C5 and C1 in FIG. 9 are anti-self-excited oscillation capacitors for amplifier feedback, and feedback resistors R82 and R83 determine amplification factors of the headphone amplifier. The stereo sound is directly outputted to a headphone jack through the chip of the headphone amplifier, and an electrical signal drives the speaker to produce sound. The chip supports OV output, so there is no need to use DC blocking capacitors for output, which is also beneficial for low-frequency response of products.

During practical use, when the gaming headphone of the present invention is connected to a computer through the USB connector 2, the computer will map information of two sound cards. In the embodiment, the two sound-card output devices are respectively named a Game device and a Chat device. The Game device is the device for outputting background sound in the gaming process, and the Chat device is the device for outputting voice during chatting between the teammates in the gaming process. When playing games online, one of the output sound card devices—the Game device is selected for outputting game background sound, and the Chat device is selected for outputting sound of teammates' voice. After such setting, the ratio of GAME sound volume to CHAT sound volume can be adjusted through the mixing potentiometer 11 on the microphone.

After considering the specification and practicing the present invention, those skilled in the art will easily come up with other embodiments of the present invention. The present application is intended to cover any variations, uses, or adaptations of the present invention that follow the general principles of the present invention and include common knowledge or customary technical means in the art that are not disclosed in the present invention. The specification and embodiments are only considered exemplary, and the true scope and spirit of the present invention are indicated by the following claims.

It should be understood that the present invention is not limited to the precise structure described above and shown in the accompanying drawings, and various modifications and changes can be made without departing from its scope. The scope of the present invention is limited to the appended claims.

What is claimed is:

1. A USB gaming headphone with dual-sound-card output, comprising a main chip having two sound cards configured to map to separate output devices on a computer, an headphone amplifier chip circuit, a microphone, a total volume potentiometer, and a mixing potentiometer electrically connected to the main chip through an RC filtering network and an analog-to-digital converter (ADC) input pin, wherein:

a first terminal of the mixing potentiometer receives a 3.3V stabilized voltage from the main chip;

a second terminal of the mixing potentiometer connects to ground, and a center tap of the mixing potentiometer outputs a voltage signal processed by the RC filtering network to eliminate AC ripple before ADC detection;

an internal program in the main chip configured to distribute sound output ratios between the two sound cards based on a detected voltage magnitude;

the headphone amplifier chip circuit with feedback resistors determining amplification factors and anti-oscillation capacitors receiving stereo signals from the main chip after internal DAC conversion;

the total volume potentiometer implemented as dual potentiometers in a headphone amplifier circuit path; and the mixing potentiometer adjusts the output of the two sound cards proportionally, amplifies signals from left and right sound channels through the headphone amplifier chip circuit, and then performs electrical-sound conversion through a speaker, the headphone amplifier chip circuit outputs to the speaker using OV-output configuration without DC blocking capacitors.

2. The USB gaming headphone with dual-sound-card output according to claim 1, wherein the microphone is sequentially connected to a microphone input circuit, a microphone amplification circuit, a microphone potentiometer, and the main chip.

3. The USB gaming headphone with dual-sound-card output according to claim 1, wherein the main chip is also electrically connected to a microphone mute switching switch and a microphone noise reduction switch, the microphone mute switching switch is used to control mute switching of a microphone, and the microphone noise reduction switch is used to switch noise reduction of the microphone.

4. The USB gaming headphone with dual-sound-card output according to claim 1, wherein the main chip is connected to an external device through a USB connector.

5. The USB gaming headphone with dual-sound-card output according to claim 1, wherein the main chip is also electrically connected to a light control chip and a light effect switching switch, and the light control chip is electrically connected to light beads on a headphone.

6. The USB gaming headphone with dual-sound-card output according to claim 1, wherein the main chip, the headphone amplifier chip circuit, a microphone mute switching switch, a microphone noise reduction switch, and the mixing potentiometer are all mounted in a control box, the control box is also provided with an EQ switching switch, a light effect switching switch, the total volume potentiometer, and a microphone potentiometer, the EQ switching switch is used to switch sound output modes, comprising a movie mode, a music mode and a game mode, the light effect switching switch is used to switch light effects, the total volume potentiometer is used to adjust a total volume output, and the microphone potentiometer is used to adjust microphone input.

7. The USB gaming headphone with dual-sound-card output according to claim 1, wherein the main chip is connected to a wireless communication module and a rechargeable battery.

8. The USB gaming headphone with dual-sound-card output according to claim 6, wherein the gaming headphone comprises left and right ear shells connected by a headband, and a data line, the control box is mounted on the data line, a light control chip and a plurality of light beads are mounted in the ear shells, a back of the control box is also provided with a back clip, and the main chip is also electrically connected to an indicator light.

* * * * *